(12) United States Patent
Wang

(10) Patent No.: US 8,170,590 B2
(45) Date of Patent: May 1, 2012

(54) METHOD, SYSTEM AND APPARATUS FOR FORKING TRANSMISSION OF SHORT MESSAGE SERVICE

(75) Inventor: Xiao Wang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 375 days.

(21) Appl. No.: 12/372,301

(22) Filed: Feb. 17, 2009

(65) Prior Publication Data
US 2009/0156242 A1 Jun. 18, 2009

Related U.S. Application Data

(63) Continuation of application No. PCT/CN2007/070501, filed on Aug. 16, 2007.

(30) Foreign Application Priority Data

Aug. 17, 2006 (CN) .......................... 2006 1 0112197

(51) Int. Cl.
*H04W 4/00* (2009.01)
(52) U.S. Cl. ........ 455/466; 455/246; 455/236; 455/238; 370/473; 370/474; 370/338
(58) Field of Classification Search .................. 455/466; 709/246, 236, 238; 370/473, 474, 338
See application file for complete search history.

(56) References Cited

U.S. PATENT DOCUMENTS

| | | | |
|---|---|---|---|
| 2003/0217174 A1* | 11/2003 | Dorenbosch et al. | 709/237 |
| 2003/0223570 A1 | 12/2003 | Partanen et al. | |
| 2004/0230697 A1 | 11/2004 | Kiss et al. | |
| 2005/0213537 A1* | 9/2005 | Ingimundarson et al. | 370/329 |
| 2006/0230154 A1* | 10/2006 | Nguyenphu et al. | 709/227 |
| 2006/0274701 A1* | 12/2006 | Albertsson | 370/338 |
| 2007/0281717 A1* | 12/2007 | Bharadwaj | 455/466 |

FOREIGN PATENT DOCUMENTS

CN 1613268 A 5/2005
(Continued)

OTHER PUBLICATIONS

Zhang, Pensheng, et al. "The Application of SIP/SIP-T Protocol in NGN", Communication World, Nov. 2002, vol. 96, pp. 30-34.

(Continued)

*Primary Examiner* — Patrick Edouard
*Assistant Examiner* — Julio Perez
(74) *Attorney, Agent, or Firm* — Brinks Hofer Gilson & Lione

(57) ABSTRACT

The present disclosure provides method, system, and apparatus for forking transmission of Short Message Service (SMS) messages in IP Multimedia Subsystems (IMS) networks. The method includes: receiving an SMS message, constructing a SIP message in which the SMS message is encapsulated or in which the SIP message carries the content of the SMS message and further includes a forking indication indicating whether forking shall be employed, sending the SIP message to a Service-Call Session Control Function (S-CSCF) in an IMS network, and determining by the S-CSCF whether forking shall be employed according to the forking indication. The method and system of the present disclosure enables the control over the SMS message from the Circuit Switched (CS) domain so that the SMS message can be sent through forking in the IMS domain to more than one user terminal.

4 Claims, 3 Drawing Sheets

FOREIGN PATENT DOCUMENTS

| CN | 1635764 A | 7/2005 |
|---|---|---|
| CN | 100461778 C | 2/2009 |
| EP | 1309211 A2 | 5/2003 |
| WO | WO 03/003653 A2 | 1/2003 |

OTHER PUBLICATIONS

Zhou, Dagang, et al. "SIP-based Mobility Management," Computer Engineering and Design, Nov. 2005, vol. 26 pp. 2937-2941.

International Search Report issued in Corresponding PCT Application No. PCT/CN2007/070501; mailed Nov. 29, 2007.

"3rd Generation Partnership Project; Technical Specification Group Services and System Aspects; Support of SMS and MMS over Generic 3 GPP IP Access Stage 2" 3GPP TS 23.204 V1.2.0; May 2006 pp. 12-13.

Rosenberg, J. et al. "Caller Preferences for the Session Initiation Protocol (SIP)" The Internet Society. Aug. 2004.

Office Action issued in corresponding Chinese Patent Application No. 2006101121973; issued Mar. 27, 2008.

Extended European Search Report issued in corresponding European Patent Application No. 07800977.6, mailed Apr. 9, 2010.

Office Action issued in corresponding European Patent Application No. 07800977.6, mailed May 12, 2011.

Written Opinion of the International Searching Authority issued in corresponding PCT Patent Application No. PCT/CN2007/070501, mailed Nov. 29, 2007.

Huawei, "Dealing with the Difference Between Existing SMS and SMS over IP", 3GPP TSG SA WG2 Architecture—S2#47. 23.804 CR 0003 7.0.0. Montreal, Canada, Jun. 27-Jul. 1, 2005. S2-051726.

3rd Generation Partnership Project 2, "Short Message Service over IMS", 3GPP2 X.S0048-0. Version v1.0, Nov. 2007.

* cited by examiner

METHOD, SYSTEM AND APPARATUS FOR FORKING TRANSMISSION OF SHORT MESSAGE SERVICE

CROSS REFERENCES TO RELATED APPLICATIONS

This application is a continuation of International Application No. PCT/CN2007/070501 filed on Aug. 16, 2007. This application claims priority to Chinese Application No. 200610112197.3 filed on Aug. 17, 2006. The entire disclosures of each of the above-referenced applications are incorporated herein by reference.

FIELD OF THE DISCLOSURE

The present disclosure relates to communications technologies, and particularly to method, system, and apparatus for forking transmission of Short Message Service (SMS) in IP Multimedia Subsystems (IMS).

BACKGROUND OF THE DISCLOSURE

Session Initiation Protocol (SIP) is one of multimedia communications system framework protocols established by Internet Engineering Task Force (IETF). SIP is a text based application layer control protocol and is independent of bottom layer protocol. SIP is used for setting up, modifying, and terminating two-party or multi-party multimedia sessions over Internet Protocol (IP) networks. In networks using SIP (e.g., IMS networks) a forking transmission method which allows a SIP message to be received by a plurality of user terminals associated with a user identifier is provided.

The forking transmission for SIP networks includes the following steps described below. Correspondence is set up between a user identifier and information of a plurality of user terminals (e.g., correspondence between a user identifier and addresses of a plurality of user terminals) in a proxy at the SIP network side. When a SIP message for the plurality of user terminals is received at the SIP network side, the SIP message is firstly forwarded to the proxy and based on the pre-set correspondence, the proxy finds out the information of the plurality of user terminals which correspond to the user identifier in the SIP message. Then the SIP message is forwarded to the plurality of user terminals corresponding to the information of the plurality of user terminals.

At present, forking transmission in SIP networks may be performed in two ways: parallel forking transmission and sequential forking transmission. In parallel forking transmission, a proxy sends several copies of a SIP message to a plurality of user terminals. While in sequential forking transmission, a proxy sends a received SIP message to a first user terminal according to a sequence pre-set for the plurality of user terminals corresponding to a same user identifier and stops sending the SIP message to other user terminals if a transmission success response is received from the first user terminal. Otherwise the proxy continues sending the SIP message to other user terminals in the pre-set sequence until a transmission success response is received or the SIP message has been sent to all the user terminals.

IMS networks are based on the SIP technology in which multimedia services are established, managed, and terminated by using a SIP call control scheme. SIP forking transmission can be adopted in an IMS network in which a proxy may be implemented by a Service-Call Session Control Function (S-CSCF) at the IMS network side. When the S-CSCF receives registration information of a user terminal, a public user identifier being used by the user terminal will be associated with the address of the user terminal and then saved. If a public user identifier is associated with addresses of a plurality of user terminals, forking transmission will take place at the S-CSCF in transmitting a SIP message to the public user identifier. The forking transmission performed by the S-CSCF is pre-configured to be parallel or sequential for sending the received SIP message. In other words, when a plurality of user terminals are associated with a same public user identifier, the user corresponding to the public user identifier may set the incoming SIP messages to be sent in parallel forking or sequential forking by configuring user data at the S-CSCF.

The SMS is fully developed and widely applied in the conventional Circuit Switched (CS) domain. In an effort to continuously develop SMS such that SMS may be experienced by users in future IP networks, 3GPP (Third Generation Partnership Project) has established a research initiative directed towards SMS over IP. According to one method provided by the research, an IP-Short-Message-Gateway (IP-SM-GW) is set up in an IP network as an SMS gateway between an IMS network domain and a CS domain. When an SMS message is sent from the IMS network domain to the CS domain, the SMS message is encapsulated into a SIP message body and sent to the IP-SM-GW. The IP-SM-GW parses the received SIP message body to retrieve the SMS message and sends the SMS message to the CS domain. When an SMS message is sent from the CS domain to the IMS network domain and received by the IP-SM-GW, the IP-SM-GW constructs a SIP message in whose message body the SMS message is encapsulated and sends the SIP message to the IMS network domain. According to another method for transmitting SMS messages over an IP network, an IP-SM-GW is set up in the IP network as a message gateway between the IMS network domain and the CS domain. When an SMS message is sent from the IMS network domain to the CS domain, the content of the SMS message is extracted, loaded into a SIP message body, and sent to the IP-SM-GW. The IP-SM-GW parses the received SIP message body to retrieve the content of the SMS message, constructs an SMS message, and sends the SMS message to the CS domain. When an SMS message is sent from the CS domain to the IMS network domain and received by the IP-SM-GW, the IP-SM-GW constructs a SIP message whose message body carries the content of the SMS and sends the SIP message to the IMS network domain.

However, both ways of sending SMS messages between the CS domain and the IMS network domain have a defect: it is impossible to manage an SMS message from the CS domain to be delivered in the IMS network domain to more than one user terminal in a forking manner.

SUMMARY OF THE DISCLOSURE

The present disclosure provides a method for forking transmission of SMS messages which enables an SMS message from a CS domain to be sent to more than one user terminal in an IMS network through forking transmission.

The present disclosure further provides a system for forking transmission of SMS messages which enables an SMS message from a CS domain to be sent to more than one user terminal in an IMS network through forking transmission.

The present disclosure further provides an apparatus for forking transmission of SMS messages which enables an SMS message from the CS domain to be sent to more than one user terminal in an IMS network through forking transmission.

According to the above aspects, technical schemes in accordance with the present disclosure are described as follows.

A method for forking transmission of SMS messages includes receiving, by an IP-Short-Message-Gateway (IP-SM-GW), an SMS message, constructing a Session Initiation Protocol (SIP) message in which the SMS message is encapsulated or in which the SIP message carries the content of the SMS message and further carries a forking indication indicating whether forking is to be employed, sending the SIP message to a Service-Call Session Control Function (S-CSCF) in an IP Multimedia Subsystems, (IMS) network, and determining, by the S-CSCF, whether forking is to be employed according to the forking indication in the received SIP message.

A system for forking transmission of SMS messages includes an IP-SM-GW and an S-CSCF in which the IP-SM-GW is adapted to receive an SMS message from a Circuit Switched (CS) domain, construct a Session Initiation Protocol (SIP) message in which the SMS message is encapsulated or in which the SIP message carries the content of the SMS message and further carries a forking indication indicating whether forking is to be employed, and send the SIP message to the S-CSCF. The S-CSCF is adapted to determine whether forking is to be employed according to the forking indication in the received SIP message and send the SIP message to a plurality of corresponding user terminals.

An apparatus for forking transmission of SMS messages includes a policy module, a constructing module and a transmission module in which the policy module is adapted to send to the constructing module a saved policy indicating whether forking is to be employed. The constructing module is adapted to receive an SMS message from a Circuit Switched (CS) domain and construct a Session Initiation Protocol (SIP) message in which the SMS message is encapsulated or in which the SIP message carries the content of the SMS message and further carries a forking indication indicating whether forking is to be employed according to the policy received from the policy module. The transmission module is adapted to send the constructed SIP message.

An apparatus for forking transmission of SMS messages includes a receiving module and a processing and transmission module in which the receiving module is operable for receiving a Session Initiation Protocol (SIP) message which carries a forking indication indicating whether forking transmission is to be employed and in which an SMS message is encapsulated or which carries the content of an SMS message. The processing and transmission module is operable for deciding whether forking transmission is to be employed according to the forking indication in the received SIP message and sending the SIP message to a plurality of corresponding user terminals.

It can be seen from the above technical schemes according to the present disclosure that a forking indication indicating whether forking transmission shall be employed is carried in a SIP message in which an SMS message is encapsulated, and the S-CSCF receiving the SIP message determines whether forking transmission shall be applied to the SIP message according to the forking indication carried in the SIP message. Furthermore, the SIP message may carry a forking mode indication besides the forking indication, and the S-CSCF employs the forking transmission of corresponding forking mode according to the forking mode indication in the SIP message. Therefore, the method and system of the present disclosure enables an SMS message from the CS domain to be sent through forking transmission to more than one user terminal in an IMS network. Moreover, in embodiments of the present disclosure, a policy may be set in the S-CSCF to indicate whether the SIP message in which the SMS is encapsulated and which is from the IP-SM-GW shall be sent through forking transmission in a specified forking mode. And in such case, when the S-CSCF receives from the IP-SM-GW a SIP message in which an SMS message is encapsulated, the S-CSCF may decide according to the pre-set policy whether the SIP message shall be sent through forking transmission and the forking mode to be employed.

DETAILED DESCRIPTION OF THE EMBODIMENTS

Figure 1:
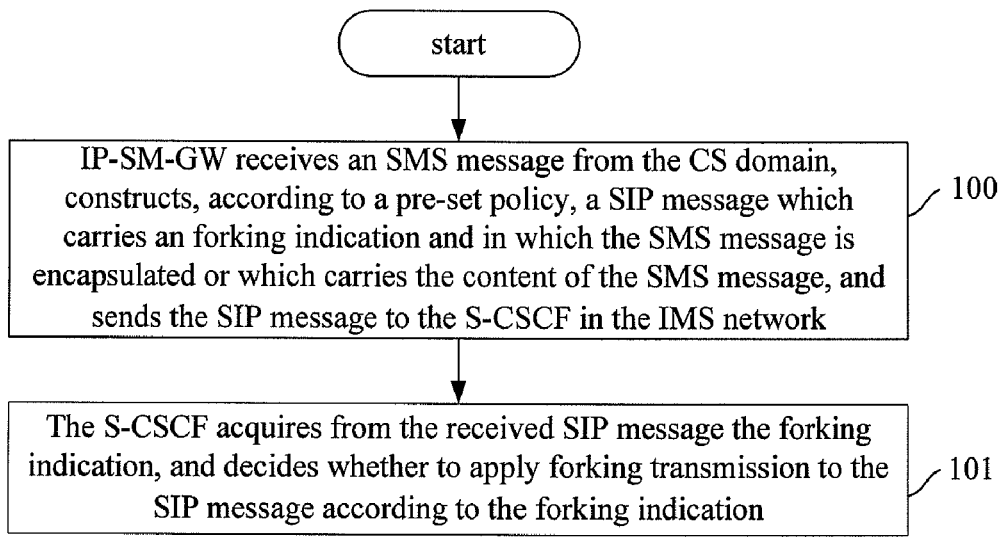
FIG. 1 is a flow chart of implementing forking transmission of an SMS message in an IMS network in accordance with an embodiment of the present disclosure.

This disclosure is hereinafter further described in detail with reference to the accompanying drawings as well as embodiments so as to make the objective, technical solution and merits more apparent.

When an SMS message from a CS domain is sent to an IMS network domain, an IP-SM-GW constructs a SIP message in which the SMS message is encapsulated or which carries the content of the SMS message and sends the SIP message to an S-CSCF in the IMS network domain. The S-CSCF processes the SIP message and sends the message to a user terminal. In order to send the SMS message from the CS domain to more than one user terminal in the IMS network domain through forking, according to embodiments of the present disclosure, a Request-Disposition header field can be set which carries a value instructing the S-CSCF whether to send the SIP message through forking, in constructing the SIP message in which the SMS message is encapsulated or which carries the content of the SMS message.

The value carried in the Request-Disposition header field of the SIP message may be:

"forking", indicating to the S-CSCF that the SIP message is allowed to be sent through forking. In which case in the prior art, the SIP message constructed by the IP-SM-GW carries a public user identifier corresponding to the telephone numbers of the destination user terminals in the CS domain. The S-CSCF determines the contact addresses of the user terminals corresponding to the public user identifier based on the correspondence and sends the message to the corresponding user terminals through forking. Further indication may be needed in the Request-Disposition header field to indicate whether to adopt parallel forking or sequential forking; or "no-fork", indicating that the S-CSCF is not allowed to send the SIP message through forking.

The Request-Disposition header field may include the value "parallel", indicating that the S-CSCF shall send the SIP message through parallel forking. In this case, the SIP message constructed by the IP-SM-GW carries a public user identifier corresponding to the CS domain telephone numbers of the destination user terminals. The S-CSCF determines contact addresses of the user terminals corresponding to the public user identifier based on the correspondence and sends the message to the corresponding user terminals through forking.

The Request-Disposition header field may alternatively include the value "sequential". The value "sequential" indicates that the S-CSCF shall send the SIP message through sequential forking. In this case, the SIP message constructed by the IP-SM-GW carries a public user identifier corresponding to the CS domain telephone numbers of the destination user terminals. The S-CSCF determines the contact addresses of the user terminals corresponding to the public user identifier based on the correspondence and further determines the transmission sequence according to a pre-set sequence. Then the S-CSCF sends the message to the first corresponding user terminals according to the transmission sequence through forking. If the first user terminal does not respond in a set period of time or returns a failure response, the message is sent to the next user terminal according to the transmission sequence, and the process repeats until a success response is returned or the message has been sent to all the corresponding user terminals.

Two embodiments are given hereinafter to further illustrate the present disclosure. When the Request-Disposition field of the SIP message which carries the content of the SMS message or in which the SMS message is encapsulated includes the values of "fork" and "parallel", the Request-Disposition field indicates that the S-CSCF is allowed to send the SIP through parallel forking transmission. When the Request-Disposition field of the SIP message includes the values of "no-fork", the Request-Disposition field indicates that the S-CSCF is not allowed to employ forking.

The IP-SM-GW configures the values of forking indication which indicate whether to perform forking in the Request-Disposition field of the SIP message, in which the SMS message is encapsulated or which carries the content of the SMS message. In an embodiment of the present disclosure, policies can be set in the IP-SM-GW to control whether the SMS message shall be sent through forking and the forking mode. Furthermore, different policies can be set in the IP-SM-GW to apply different forking policies to SMS messages from different user terminals in the CS domain. For example, three lists or sets can be set in the IP-SM-GW, which may be named no-fork, fork-parallel, and fork-sequential, respectively. The lists or sets record the information of destination user terminals in the CS domain (e.g., telephone numbers). When the IP-SM-GW receives an SMS message from the CS domain, the IP-SM-GW checks which list or set the information of the destination user terminal (the information may be obtained from the SMS message or acquired from the CS domain network) is mapping to and thus determines which one of "no-fork", "fork-parallel", and "fork-sequential" will be contained in the Request-Disposition field of the SIP message constructed in which the SMS message is encapsulated or which carries the content of the SMS message.

FIG. 1 is a flow chart of implementing forking of an SMS message in an IMS network in accordance with an embodiment of the present disclosure and the steps are described as follows.

In step 100, the IP-SM-GW receives an SMS message from the CS domain, constructs, according to a pre-set policy, a SIP message which carries an forking indication indicating whether forking shall be employed and which carries the content of the SMS message or in which the SMS message is encapsulated, and sends the SIP message to the S-CSCF in the IMS network. When the SIP message carries the forking indication indicating that forking shall be employed, the SIP message shall further carry a forking mode indication indicating the forking mode to be employed.

A plurality of policies may be adopted, e.g., correspondence between information of the source user terminals and determination on whether forking shall be employed plus the forking mode. It can be determined based on the destination user terminal information carried in the SMS message or acquired from the CS domain network whether forking shall be employed. Then the field containing the forking indication indicating whether forking shall be employed (e.g., the Request-Disposition field) is added into the constructed SIP message.

In step 101, the S-CSCF acquires, from the received SIP message, the forking indication indicating whether forking shall be employed and then determines whether to apply forking to the SIP message according to the forking indication. If the forking indication carried in the SIP message indicates that a forking shall be employed, the S-CSCF further acquires the forking mode and determines a plurality of user terminal addresses corresponding to a public user identifier carried by the SIP message based on the pre-set correspondence. After that the S-CSCF sends the SIP message in the forking mode specified in the SIP message to a plurality of destination user terminals corresponding to the plurality of destination user terminal addresses. If the forking indication carried in the SIP message indicates no forking shall be employed, the SIP message shall be sent directly to one of the plurality of user terminals corresponding to the public user identifier carried by the SIP message.

Figure 2:
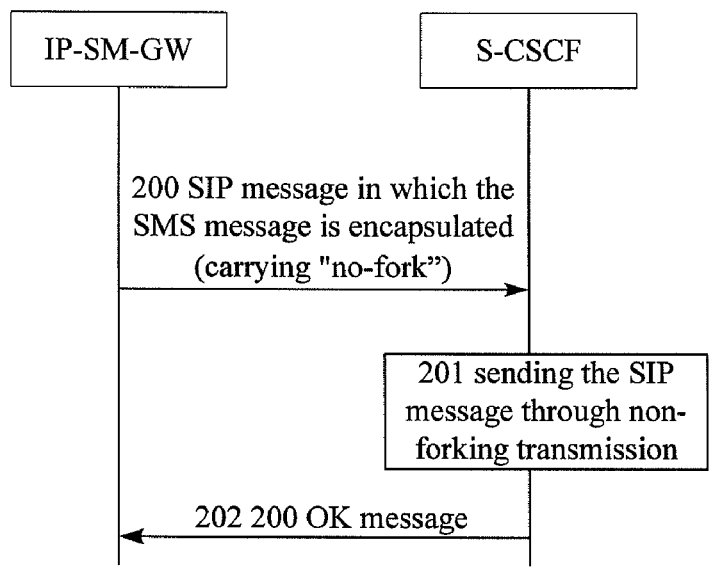
FIG. 2 is a flow chart of Method 1 for implementing forking transmission of an SMS message in an IMS network in accordance with an embodiment of the present disclosure.

Three embodiments of the present disclosure are given below. FIG. 2 is a flow chart of Method 1 for implementing forking of an SMS in an IMS network in accordance with an embodiment of the present disclosure and the steps are described as follows.

In step 200, the IP-SM-GW sends a constructed SIP message in which the SMS message is encapsulated or which carries the content of the SMS message, and the Request-Disposition field of the message carries the value of "no-fork" indicating the S-CSCF shall not apply forking to the SIP message.

Obviously, the IP-SM-GW constructs the SIP message upon receipt of an SMS message from the CS domain, and the SIP message carries a public user identifier corresponding to telephone number(s) of one or more destination user terminals in the CS domain, and the telephone numbers are carried by the SMS message to the IP-SM-GW or acquired by the IP-SM-GW directly from the CS domain as in the prior art.

In step 201, the S-CSCF detects that the Request-Disposition field of the SIP message has the value of "no-fork" and sends the SIP message through non-forking to one of the one or more user terminals corresponding to the public user identifier carried in the SIP message.

In step 202, the S-CSCF receives an acknowledgement (e.g., a 200 OK message) from the user terminal in response to the SIP message and forwards the acknowledgement to the IP-SM-GW.

Figure 3:
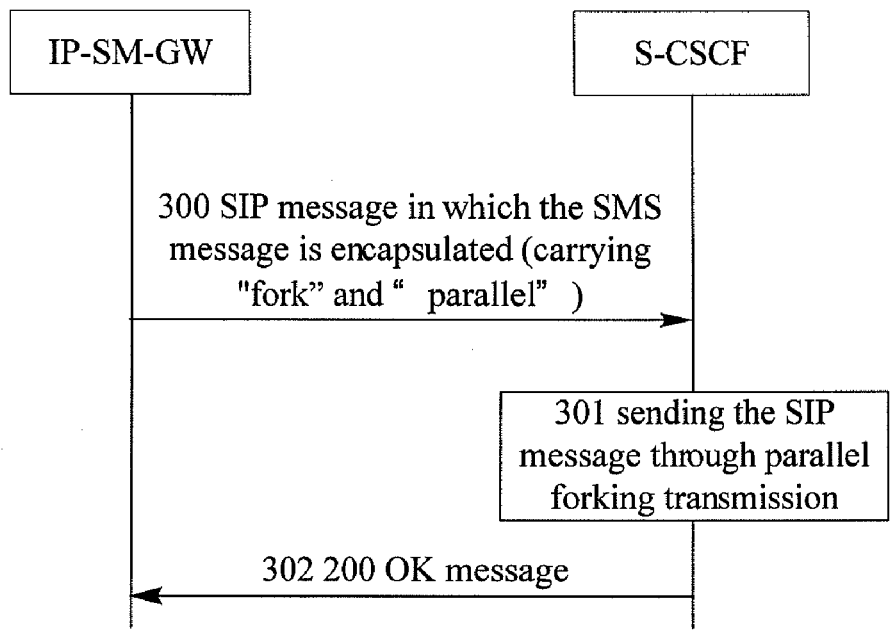
FIG. 3 is a flow chart of Method 2 for implementing forking transmission of an SMS message in an IMS network in accordance with an embodiment of the present disclosure.

FIG. 3 is a flow chart of Method 2 for implementing forking of an SMS in an IMS network in accordance with an embodiment of the present disclosure and the steps are described as follows.

In step 300, the IP-SM-GW sends a constructed SIP message in which the SMS message is encapsulated or which carries the content of the SMS message, and the Request-Disposition field of the message carries the values of "fork" and "parallel" indicating the S-CSCF shall apply parallel forking to the SIP message.

In step 301, the S-CSCF detects that the Request-Disposition field of the SIP message carries the values of "fork" and "parallel" and therefore sends the SIP message through parallel forking to a plurality of user terminals corresponding to the public user identifier carried in the SIP message.

In step 302, the S-CSCF receives acknowledgements (e.g., 200 OK messages) from a plurality of user terminals in response to the SIP message and forwards one of the acknowledgements to the IP-SM-GW.

Figure 4:
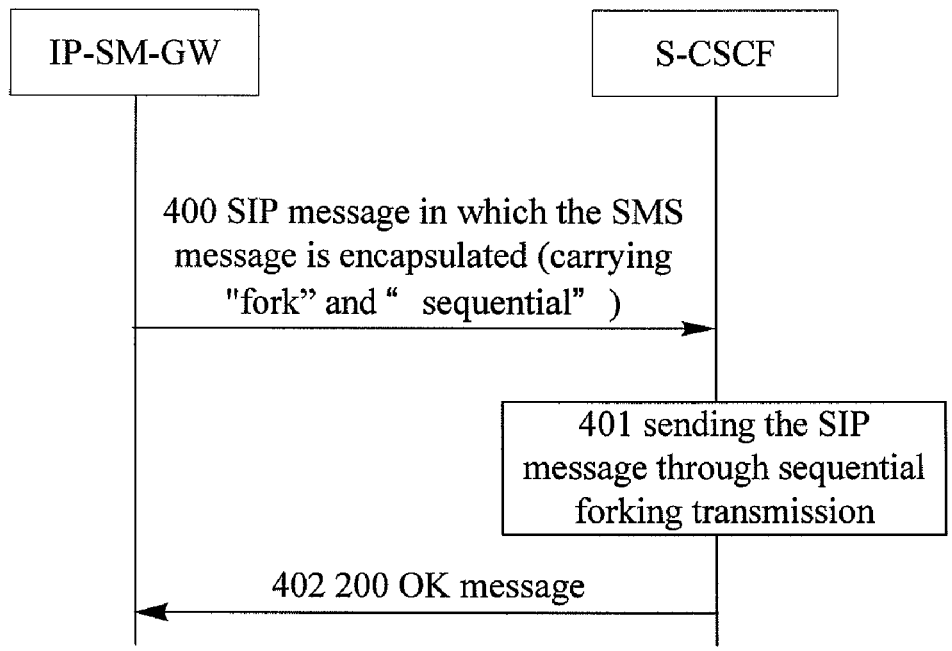
FIG. 4 is a flow chart of Method 3 for implementing forking transmission of an SMS message in an IMS network in accordance with an embodiment of the present disclosure.

FIG. 4 is a flow chart of Method 3 for implementing forking of an SMS in an IMS network in accordance with an embodiment of the present disclosure, and the steps are described as follows.

In step 400, an IP-SM-GW sends a constructed SIP message in which an SMS message is encapsulated or which carries the content of an SMS message, and the Request-Disposition field of the message carries the values of "fork" and "sequential" indicating the S-CSCF shall apply sequential forking to the SIP message.

In step 401, the S-CSCF detects that the Request-Disposition field of the SIP message carries the values of "fork" and "sequential", therefore sends the SIP message through sequential forking to a plurality of user terminals one by one according to the sequence specified in the SIP message, wherein the plurality of user terminals all correspond to the public user identifier carried in the SIP message.

In step 402, the S-CSCF receives acknowledgements corresponding to the SIP message (e.g., a 200 OK message) from the user terminals and forwards the acknowledgements to the IP-SM-GW.

Another method for forking transmission of SMS messages can be employed in an embodiment of the present disclosure i.e., a common policy may be set in an S-CSCF which processes SIP messages in which SMS messages are encapsulated. The S-CSCF checks whether a SIP message is sent from an IP-SM-GW before initiating a forking transmission and sends the SIP message through forking to a plurality of user terminals according to the pre-set correspondence if the SIP message is from the IP-SM-GW.

Another method for forking of SMS messages can be further employed in an embodiment of the present disclosure, i.e., a user with a plurality of user terminals may configure a forking policy in the S-CSCF for receiving IMS messages. The configuration is specified as follows.

In the S-CSCF, when a user does not configure forking for SMS messages, one of the user terminals of the user shall be dedicated to sending and receiving SMS messages. When the user configures parallel forking for SMS messages, a plurality of user terminals of the user shall be mapped with a public user identifier. When the user configures sequential forking for SMS messages, besides being mapped with a public user identifier, the plurality of user terminals of the user shall also be arranged in a sequence for receiving messages.

Figure 5:
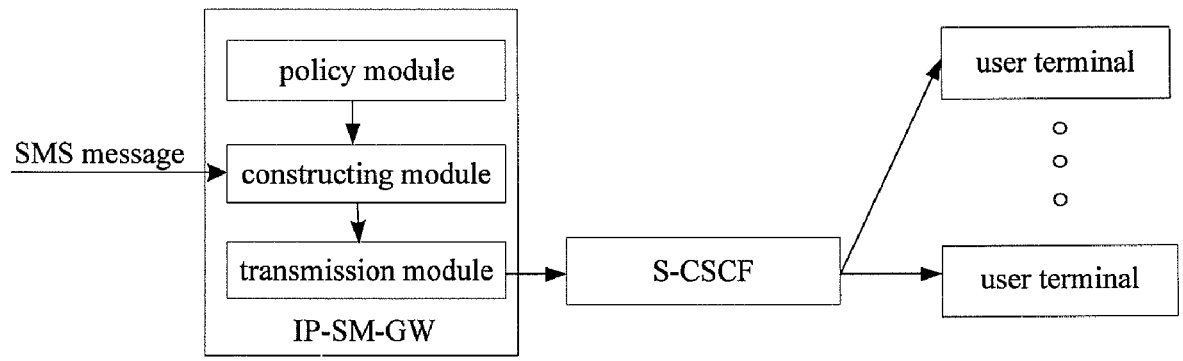
FIG. 5 is a schematic diagram illustrating a system for implementing forking transmission of an SMS message in an IMS network in accordance with an embodiment of the present disclosure.

An embodiment of the present disclosure also provides a system for forking of SMS messages in an IMS network, as shown in FIG. 5. The system includes an IP-SM-GW, an S-CSCF, and a plurality of user terminals.

The IP-SM-GW is adapted to receive an SMS messages from the CS domain, construct a SIP message in which the SMS message is encapsulated or which carries the content of the SMS message and which carries a forking indication indicating whether forking shall be employed, and send the SIP message to the S-CSCF.

The S-CSCF is adapted to determine whether forking shall be employed according to the forking indication carried in the received SIP message and send the SIP message to a plurality of corresponding user terminals.

In an embodiment of the present disclosure, the S-CSCF further includes a receiving module and a processing and transmission module.

The receiving module is adapted to receive a SIP message in which an SMS message is encapsulated or which carries the content of the SMS message and which carries a forking indication indicating whether forking shall be employed.

The processing and transmission module is adapted to determine whether forking shall be employed according to the forking indication carried in the received SIP message and send the SIP message to a plurality of corresponding user terminals.

In an embodiment of the present disclosure, the IP-SM-GW includes a policy module, a constructing module, and a transmission module.

The policy module is adapted to send to the constructing module a stored policy indicating whether a forking shall be employed.

The constructing module is adapted to receive an SMS message from the CS domain, construct a SIP message in which the SMS message is encapsulated or which carries the content of the SMS message and which carries a forking indication indicating whether forking shall be employed according to the policy received from the policy module, and send the SIP message to the transmission module.

The transmission module is adapted to transmit the constructed SIP message.

In an embodiment of the present disclosure, the policy indicating whether forking shall be employed may be correspondence between the identifications of destination user terminals in CS domain and whether forking shall be employed. The user terminals are adapted to receive the SMS message.

Figure 6:
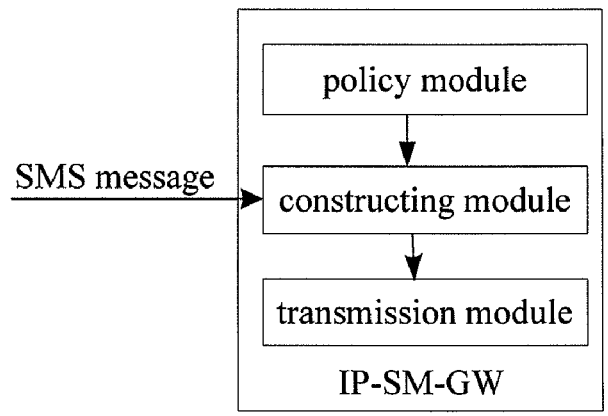
FIG. 6 is a schematic diagram illustrating a structure of an IP-SM-GW in accordance with an embodiment of the present disclosure.

FIG. 6 is a schematic diagram illustrating a structure of an IP-SM-GW in accordance with an embodiment of the present disclosure. The IP-SM-GW includes a policy module, a constructing module, and a transmission module.

The policy module is adapted to send to the constructing module a stored policy indicating whether forking shall be employed.

The constructing module is adapted to receive an SMS message from the CS domain and construct according to the policy obtained from the policy module a SIP message in which the SMS message is encapsulated or which carries the content of the SMS message and which carries a forking indication indicating whether forking shall be employed.

The transmission module is adapted to transmit the constructed SIP message.

An embodiment of the present disclosure further provides an S-CSCF which includes a policy setting module and a processing module.

The policy setting module is adapted to set a policy for processing a SIP message in which an SMS message is encapsulated or which carries the content of an SMS message and deliver the policy to the processing module.

The processing module is adapted to determine according to the policy obtained from the policy setting module whether to apply forking to the received SIP message, acquire user terminal information corresponding to a public user identifier carried in the SIP message according to pre-set correspondence between a public user identifier and information of more than one user terminal, and send the SIP message to user terminals corresponding to the user terminal information.

In an embodiment of the present disclosure, a forking indication indicating whether transmission shall be employed is carried in the SIP message in which the SMS message is encapsulated. The S-CSCF receiving the SIP message determines whether forking shall be applied to the SIP message according to the forking indication. Furthermore, when the SIP message carries the forking indication indicating that forking shall be employed, the SIP message shall further carry a forking mode indication indicating the forking mode to be employed. According to the forking mode indication in the SIP message, the S-CSCF employs forking of the corresponding forking mode. Therefore, the method and system of the present disclosure enables an SMS message from the CS domain to be sent through forking in the IMS network to more than one user terminal.

The purpose, technical solution and merits of this disclosure have been described in detail in the preceding exemplary embodiments. It should be appreciated that the foregoing is only embodiments of this disclosure and does not constitutes any limitation of the disclosure. Any modification, equivalent substitution, improvement within the spirit and principle of the disclosure should be covered in the protection scope of the disclosure.

What is claimed is:

1. A method for forking transmission of Short Message Service (SMS), comprising:
   receiving, by an IP-Short-Message-Gateway (IP-SM-GW), an SMS message;
   constructing a Session Initiation Protocol (SIP) message in which the SMS message is encapsulated or which carries the content of the SMS message and which carries a forking indication indicating whether forking is to be employed;
   sending the SIP message to a Service-Call Session Control Function, S-CSCF, in an IP Multimedia Subsystems, IMS, network; and
   determining, by the S-CSCF, whether forking is to be employed according to the forking indication in the received SIP message; and
   if the S-CSCF determines that forking is to be employed, determining, by the S-CSCF, the information of user terminals corresponding to a public user identifier carried in the SIP message according to pre-set correspondence between the public user identifier and the information of more than one user terminal; and
   sending the SIP message to the user terminals corresponding to the information of user terminals,
   wherein the SIP message further comprises a forking mode indication which indicates the forking mode to be employed by the S-CSCF, and the constructing the SIP message comprises:
   determining, by the IP-SM-GW, according to pre-set correspondence between a forking mode and Circuit Switched (CS) domain identifications of destination user terminals which are adapted to receive the SMS message, the forking mode indication for the CS domain identifications of the destination user terminals, constructing the SIP message in which the SMS message is encapsulated or which carries the content of the SMS message and which carries the forking mode indication.

2. The method according to claim 1, wherein the forking mode indication comprises a parallel forking indication or a sequential forking indication.

3. The method according to claim 1, wherein constructing the SIP message comprises:
   setting, by an IP-SM-GW, correspondence between CS domain identifications of destination user terminals which are adapted to receive the SMS message and indication on whether forking is to be employed;
   determining the forking indication which indicates whether forking is to be employed according to the correspondence; and
   constructing a SIP message, in which the SMS message is encapsulated or which carries the content of the SMS message, and which carries the forking indication.

4. The method according to claim 1 or 3, wherein at least one of the forking indication and the forking mode indication is carried in the Request-Disposition header field of the SIP message.

* * * * *